Nov. 4, 1958 J. H. AUER, JR., ET AL 2,859,435
SPEED MEASURING SYSTEM
Filed Nov. 8, 1955
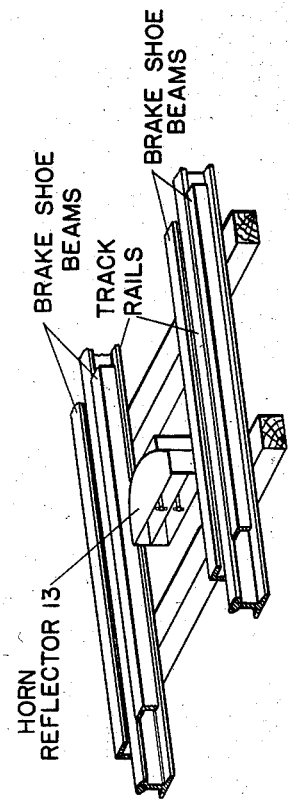
FIG. 1.
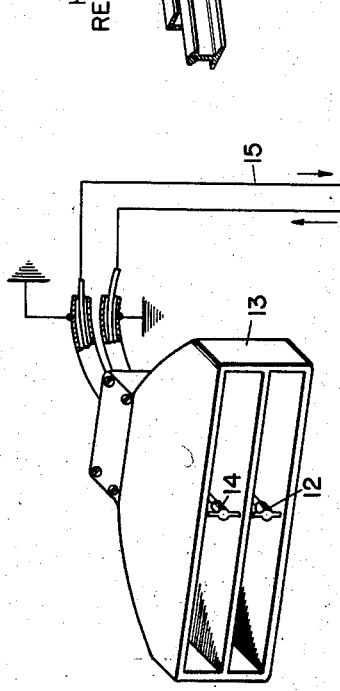
FIG. 2.
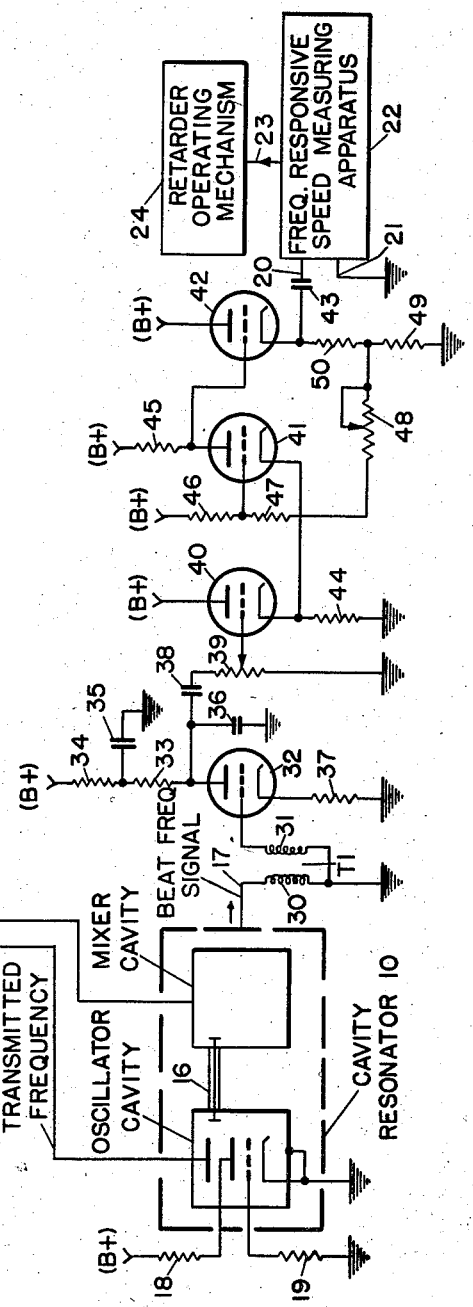
INVENTORS
J.H.AUER JR. AND
H.C.KENDALL
BY
Forest B. Hitchcock
THEIR ATTORNEY

United States Patent Office 2,859,435
Patented Nov. 4, 1958

2,859,435

SPEED MEASURING SYSTEM

John H. Auer, Jr., and Hugh C. Kendall, Rochester, N. Y., assignors to General Railway Signal Company, Rochester, N. Y.

Application November 8, 1955, Serial No. 545,706

4 Claims. (Cl. 343—8)

This invention relates to an automatic retarder control system and more particularly pertains to an improved amplifier organization for use in a Doppler frequency shift speed measuring apparatus.

In a railroad car classification yard, freight cars are permited to roll, either singly or in "cuts" of several cars, by gravity down a grade and over a plurality of route selecting switches so that each will arrive at its predetermined destination track. The grade of the yard is selected so that even a light, hard rolling car will reach its intended destination. Car retarders, comprising brake shoe beams disposed along the track rails in a manner to grip the car wheels with a controllable pressure, are provided at various points so that the speed of a car passing through the retarder can be properly controlled.

In such a system, it is desirable to provide apparatus that continually provides an output indicative of the instantaneous velocity of each car passing over a particular stretch of track. From this speed information, it is possible, for example, to cause each retarder to be released when the car in it has had its speed reduced to a preselected value. The speed measuring apparatus also makes it possible to determine the change in velocity of a car over a given test section of track, and from this the comparative rollability of each car can be found. Rollability information is important because it affects greatly the speed at which a car should be allowed to leave the final retarder in order to reach its destination track at a desirable coupling speed.

In the speed measuring apparatus of this invention, a high frequency signal is generated and supplied to a transmitting antenna positioned substantially at the focus of a parabolic horn reflector. This signal is then propagated in a highly directional pattern towards a moving railway car and is reflected from the surface of the car with a shift in frequency that is proportional to car speed. This reflected signal is partially intercepted by a receiving antenna which is also located substantially at the focus of a parabolic horn reflector. This reflected signal is then mixed with a portion of the originally generated signal, and a beat frequency signal whose frequency equals the shift in frequency of the reflected signal is then obtained by rectification and filtering. The audio beat frequency signal is amplified by a novel amplifier organization disclosed herein, with the amplified signal being then used to control frequency responsive speed measuring apparatus. The speed measuring apparatus may comprise one or more speed responsive relays which are selectively actuated at predetermined speed levels. These relays may then be used, for example, to control the operation of the car retarder so that its braking pressure can be released when car speed has reached a preselected value.

It has been found desirable in practice to locate the transmitting and receiving antennas and their associated reflecting horns between the track rails and sufficiently below the level of the top of the rails to insure that this equipment will not be damaged by passing vehicles. When a car is still at some distance from the transmitting antenna, the strength of the signal impinging upon the car surfaces is low and a corrsepondingly low amplitude of reflected signal is received by the receiving antenna. However, when a vehicle is immediately in approach of, or directly over, the transmitting antenna, the reflected signal becomes very much larger in amplitude. For this reason alone, there is a large range of variation in amplitude of the reflected signal, and the associated amplifier organization must, therefore, be so organized that it can accommodate this large range.

Large variations in amplitude of reflected signal also result because of irregularities in the radiation pattern of the transmitted signal. For this reason, a moving vehicle may be travelling at one instant through a region where the transmitted signal is of very large amplitude and then instantly move to an adjoining region where the signal is of very much smaller amplitude. These amplitude variations have been found difficult to be accommodated by the usual amplifier organization because the amplitude changes may occur within a very short period of time. The tendency is, therefore, for the large amplitude reflected signal to block the amplifier so that the immediately following weak amplitude reflections are not effective and produce no output from the amplifier. This leads to inaccuracy in the determination of vehicle speed.

In a car retarder control system, it is necessary that the speed measuring apparatus be able to measure vehicle speeds ranging from perhaps 16 M. P. H. to substantially zero M. P. H. If the frequency of the originally transmitted signal is of the order of 2400 megacycles, the beat frequency signal that must be amplified by the associated amplifier organization may thus range in value from approximately 110 to substantially zero cycles per second. The amplifier must, therefore, be provided with unusually low frequency response characteristics.

The dual characteristics required, of substantially uniform low frequency amplification characteristics, along with the ability to accommodate extremely large variations of signal strength, are generally considered to be opposing requirements since good low frequency characteristics in an amplifier are generally associated with the use of large value coupling capacitors These large value coupling capacitors, on the other hand, tend to provide long time constants whose charge cannot quickly be varied in response to rapid variations of signal strength Despite this, the amplifier organization of this invention provides both the desirable uniform amplification of frequencies over the desired range along with the ability to cope with extremely large and sudden variations in amplitude of the reflected signal Accordingly, one object of this invention is to provide an amplifier organization for a Doppler type speed measuring system having substantially uniform amplification for the low frequency range corrseponding to vehicle speeds extending to substantially zero miles per hour Another object of this invention is to provide an amplifier organization for a Doppler type speed measuring system having the capability of accommodating extremely large and sudden variations in amplitude of its input signal An additional object of this invention is to provide an amplifier organization for a Doppler type speed measuring system having both uniform low frequency amplification characteristics and the ability to amplify signals varying widely in amplitude within short time periods without resulting in the loss of any of the amplfier signal Other objects, purposes and characteristic features of this invention will in part be obvious from the drawings and in part pointed out as the description of the invention progresses. In describing this invention, reference will be made to the accompanying drawings in which:

Fig. 1 illustrates diagrammatically how the transmitting and receiving antennas of the speed measuring system of this invention may be positioned with respect to the track rails; and Fig. 2 illustrates the circuit organization of the amplifier of this invention.

To facilitate the description of this invention, the drawings have been simplified and certain conventional illustrations are used. Thus, the symbol (B+) with an associated arrow tail and the symbol for a ground connection represent connections made to opposite terminals of a source of direct voltage suitable for the operation of the electronic apparatus of this invention.

Described briefly, the Doppler type speed measuring apparatus of this invention comprises, as shown in Fig. 2, a cavity resonator 10 which generates a high frequency continuous wave signal whose frequency may be on the order of 2400 megacycles per second. This signal is obtained from the oscillator cavity portion of the cavity resonator 10 and applied over a coaxial cable 11 to the transmitting antenna 12 which is positioned approximately at the focus of the lower half of the parabolic horn reflector 13. The transmitted signal is reflected from the surfaces of a moving car, and this reflected signal is then intercepted in part by the receiving antenna 14 located in the upper half of the parabolic horn reflector 13. This reflected signal, with its frequency shifted by an amount corresponding to the speed of the vehicle is then applied to the mixer cavity portion of the cavity resonator 10 over coaxial cable 15. In the mixer cavity, this reflected signal is mixed with a portion of the signal generated in the oscillator cavity and applied to the mixer cavity by means of a mixer probe 16. This mixer cavity comprises means for both rectifying and filtering the mixed signals with the result that an audio beat frequency signal appears on wire 17 with its frequency directly proportional to vehicle speed.

The cavity resonator 10 has been shown only diagrammatically and will not be described in detail since its structure forms no part of this invention, and the operation of a cavity resonator of this kind is well-known and fully described in the prior art. Briefly, the oscillator cavity portion is shown as including a triode tube whose plate is connected to (B+) by resistor 18. The grid of this tube is connected through resistor 19 to ground, and the cathode is directly grounded. In one specific embodiment of this invention, a novel cavity resonator combining in one structure both the oscillator and mixer functions was used. Its structure has been fully disclosed in our co-pending application Serial No. 545,705 filed on the same date herewith.

The parabolic horn reflector 13 may be positioned, as in one embodiment of this invention, between and below the track rails as diagrammatically illustrated in Fig. 1. The horn 13 is mounted upon a suitable pedestal and then connected by coaxial cables passing under the track rails to an equipment case nearby housing the cavity resonator 10 and the associated amplifying equipment illustrated in Fig. 2. Output wires 20 and 21 of this apparatus then connect to the frequency speed measuring apparatus 22 which may be housed some distance away in a building provided for the purpose of housing all the necessary equipment for a car classification yard. From this building come control wires, diagrammatically illustrated by the lead 23 in Fig. 2, to the retarder control mechanism 24 which is, of course, actually at the site of the retarder. In practice, various control and computing functions are associated with the block 22 designated "Frequency Responsive Speed Measuring Apparatus," but since these form no part of this invention, they will not be described in detail here. A detailed disclosure of such apparatus is included in our prior copending application Serial No. 513,364, filed June 6, 1955.

The audio beat frequency signal appearing on wire 17 is applied to the primary winding 30 of transformer T1. This primary winding 30 is connected between wire 17 and ground, and the secondary winding is connected between the grid of tube 32 and ground. The turns ratio of this transformer is selected to match the low output impedance of the mixer cavity to the much higher input impedance of the grid-cathode circuit of tube 32.

The plate of tube 32 is connected through resistors 33 and 34 in series. The junction of these two resistors is connected through capacitor 35 to ground. Resistor 34 and capacitor 35 comprise a decoupling filter, whereby a relatively low impedance path to ground is provided by capacitor 35 as compared to the higher impedance offered by resistor 34.

A by-pass capacitor 36 is connected from the plate of tube 32 to ground. Although this capacitor presents a relatively high impedance to the low frequency of the input signal to tube 32, it acts as a low impedance shunt to ground for higher frequencies representing spurious and undesirable components that might be present in the input signal.

The cathode of tube 32 is connected through cathode resistor 37 to ground. The flow of plate current through this resistor is effective to establish the required class A operating bias for this tube. This resistor is not bypassed in the usual way by a capacitor so that a degenerative feedback effect is produced which tends to stabilize the operation of this amplifier.

The output signal of tube 32 appearing across its plate load resistor 33 is applied through the coupling capacitor 38 to potentiometer 39 and thus directly to the grid of cathode follower tube 40. The lower terminal of potentiometer 39 is returned to ground to provide a grid return resistor connection for tube 40. Capacitor 38 is selected to have a large value of capacitance to minimize thereby a decrease in amplification of low frequencies.

Tubes 40, 41 and 42 comprise a direct-current amplifier whose function is to provide at its output, a voltage which is the exact duplicate of the grid voltage of tube 40 with the exception that it is of a much greater amplitude. Described briefly, this direct-current amplifier comprises for its first stage tube 40 which is operated as a cathode follower. The output voltage of tube 40 is cathode-coupled to tube 41 which is operated as a high gain voltage amplifier. The output of tube 41, obtained from its plate, drives the control grid of cathode follower output tube 42. The output of this tube obtained from its cathode is applied through capacitor 43 to wires 20 and 21. Capacitor 43 prevents a direct voltage from appearing on the wires 20 and 21.

Although the input voltage to tube 40 may vary through an exceedingly large range of amplitude, it is necessary that the average value of the voltage at the cathode of tube 42 remain essentially fixed. If this is not done, the average voltage across coupling capacitor 43 will change in amplitude in accordance with the average value of the voltage on the cathode of tube 42. Consequently, if the output voltage at this cathode should rise with a high signal amplitude, the capacitor 43 would charge to a higher voltage. As a result, a very weak signal, following immediately after the large signal, would vary about a base line substantially below the cut-off level of some subsequent tube in the frequency responsive speed measuring apparatus 22 and would, therefore, be momentarily ineffective until the capacitor 43 had reestablished its average charge to the new quiescent conditions. It may be said in summary, therefore, that the average value of voltage at the cathode of tube 42 should remain essentially constant despite extremely large variations of signal level at the grid of tube 40, and that this should be accomplished without impairing in any way the uniform low frequency amplifying characteristics of the amplifier organization.

The desired level of input voltage for cathode follower tube 40 is selected by proper adjustment of the tap on potentiometer 39. Tube 40 is operated as a conventional cathode follower, having its output voltage developed across cathode resistor 44. The cathode of the voltage amplifier tube 41 is connected directly to the cathode of tube 40 so that the output voltage of tube 40 is repeated exactly at the cathode of tube 41. The beat frequency signal causes the cathode of tube 41 to rise and fall sinusoidally with respect to the grid. The resulting plate current variations produce corresponding voltage variations across the plate resistor 45. This plate of tube 41 is connected directly to the grid of cathode follower tube 42.

The voltage present on the cathode of tube 41 in the absence of an input signal to tube 40 is determined by the amount of plate current of both tube 40 and 41 passing through the common cathode resistor 44, and, since tube 40 is operated as a cathode follower, this results in a substantial voltage drop across resistor 44 so that the quiescent voltage on the cathode of tube 41 is at a substantial level above ground.

With this relatively high cathode potential of tube 41, it is necessary that the grid of this tube also be maintained at a positive potential to establish its proper operating bias voltage. This bias voltage is obtained by connecting the grid of tube 41 to the junction of resistors 46 and 47. These resistors 46 and 47 are part of a voltage divider that extends from (B+) and also includes the variable resistor 48 and cathode resistor 49 of tube 42. Thus, the output current of tube 42, which affects the voltage across resistor 49, affects also the level of bias voltage provided for tube 41.

For signals of small amplitude amplified by the voltage amplifier including tube 41, clipping of the signal cannot occur. However, when the signal reaches large amplitudes, cut-off clipping occurs when the cathode of tube 41 is driven far positive on the positive peaks of the input signal and saturation clipping occurs on the negative peaks of the signal on this cathode. It is desirable that the bias on tube 41 be so maintained that the clipping on positive and negative signal peaks will occur at voltage levels substantially equidistant from the base line or average value of the signal voltage. If this is done, the resultant clipping will be almost equally effective on both negative and positive half cycles so that the voltage at the plate of tube 41 will be maintained symmetrical with substantially no variation in its average level.

To accomplish this, the voltage divider in the grid of tube 41 comprising resistors 46—49 has its values of resistance properly selected to provide the required operating bias for producing this effect. The amplifying means of this invention has been so organized, moreover, that variations in the average value of the output signal tend to be automatically corrected. This is provided by the connection of the right-hand terminal of variable resistor 48 to the junction of cathode load resistors 49 and 50. A rise in average voltage at the cathode of tube 42 raises the voltage at the junction of resistors 49 and 50 also. This voltage rise also increases the grid voltage of tube 41, causing it to conduct more plate current. As a result, the plate voltage of tube 41 decreases, causing a corresponding decrease in grid to cathode voltage of tube 42. A drop in average value of the voltage at the cathode of tube 42 results, similarly, in a decrease of grid voltage of tube 41, thereby increasing the voltage at the cathode of tube 42. The value of resistor 48 in this feedback network may be adjusted to provide the required effect upon the grid voltage of tube 41.

There is thus provided by this organization, a direct-current amplifier with its attendant advantages of uniform amplification characteristics for the very low frequencies desired to be amplified. This direct-current amplifier is so organized that the average level of output voltage is substantially unaffected despite extremely large variations in input voltage, thereby making it impossible for signals of large amplitude to block signals of small amplitude which follow immediately after.

Having described an improved amplifier organization for a Doppler type speed measuring apparatus as used in an automatic car retarder system, we desire it to be understood that various modifications, adaptations and alterations may be made to the specific form shown to meet the requirements of practice without in any manner departing from the spirit or scope of this invention.

What we claim is:

1. In a speed measuring system for a railroad car classification yard, circuit means for providing a signal voltage having its frequency proportional to the velocity of a moving car, said voltage at times varying rapidly over a large range of amplitude, amplifying circuit means for said signal voltage comprising a voltage amplifier electron tube having said signal voltage applied to its control grid-cathode circuit, an output tube having the output voltage of said voltage amplifier to be applied directly to its control grid, biasing circuit means for said voltage amplifier tube providing a bias level to cause clipping of said signal voltage when of large amplitude to occur at voltage levels substantially equi-distant above and below the average value of said voltage, said biasing circuit means being governed by the output voltage of said output tube to decrease the negative grid-cathode bias voltage of said voltage amplifier tube in response to an increase in output of said voltage amplifier tube to thereby maintain said base line of voltage substantially constant in response to variations in operating conditions of said tubes.

2. In a speed measuring system for a railroad car classification yard, means for generating a high frequency signal and for transmitting said signal toward a moving car from an antenna location and for receiving a portion of said signal being reflected from said car with a shift in frequency dependent upon the speed of said car with respect to said antenna location, circuit means being responsive to both said generated signal and said reflected signal for providing a beat frequency signal having its frequency proportional to said car speed, said beat frequency signal at times varying rapidly over a large range of amplitude, a direct-current amplifier for amplifying said beat frequency signal having a cathode follower tube with said beat frequency signal applied to its control grid, a voltage amplifier stage comprising an electron tube having its cathode connected to the cathode of said cathode follower, an output cathode follower having its grid connected to the plate of said voltage amplifier tube, biasing voltage circuit means responsive to the output voltage at the cathode of said output cathode follower tube for positively biasing the control grid of said voltage amplifier tube, whereby variations in operating values of said tubes of said direct-current amplifier result in variations in the bias voltage of said voltage amplifier tube to cause the average voltage at the cathode of said output cathode follower tube to be substantially unaffected.

3. In a speed measuring system for a railroad car classification yard, circuit means for providing a signal voltage having its frequency proportional to the velocity of a moving car, said voltage at times varying rapidly over a large range of amplitude and having its frequency extending at times to substantially zero cycles per second, amplifier circuit means for said signal voltage comprising, a cathode follower electron tube having said signal voltage applied to its control grid, a voltage amplifier electron tube having its cathode connected to the cathode of said cathode follower, a plate load resistor for said voltage amplifier electron tube, a direct connection from said plate of said voltage amplifier electron tube to the control grid of an output cathode follower tube, biasing circuit means for the control grid of said voltage amplifier electron tube being dependent upon the voltage provided in the output cathode circuit of said output cathode follower tube, said bias voltage being selected to cause clipping to occur symmetrically on the negative and positive peaks of said signal when of large amplitude to thereby minimize changes in the average value of the voltage at the cathode of said output cathode follower tube in response to large variations in amplitude of said signal voltage, said bias voltage being varied in accordance with changes in the average value of voltage at the cathode of said output cathode follower tube to thereby maintain substantially the same average value for large variations in said signal voltage.

4. In a speed measuring system for a railroad car classification yard, means for generating a high frequency signal and for transmitting said signal toward a moving car from an antenna location and for receiving a portion of said signal being reflected from said car with a shift in frequency dependent upon the speed of said car with respect to said antenna location, circuit means being responsive to both said generated signal and said reflected signal for providing a beat frequency signal having its frequency proportional to car speed, said beat frequency signal at times varying rapidly over a large range of amplitude, an amplifier organization for amplifying said beat frequency signal and comprising a direct-current amplifier including an electron tube voltage amplifier having said beat frequency signal applied to its grid-cathode circuit, and biasing voltage circuit means selected for said tube to be of a value causing clipping of the output voltage of said voltage amplifier negative and positive peaks when said signal voltage is of large amplitude to occur symmetrically about its average value, whereby variations in amplitude of said beat frequency signal are ineffective to vary the average level of output voltage of said direct-current amplifier.

References Cited in the file of this patent

UNITED STATES PATENTS

| | | |
|---|---|---|
| 2,340,364 | Bedford | Feb. 1, 1944 |
| 2,629,865 | Barker | Feb. 24, 1953 |